(12) United States Patent
Mahajan et al.

(10) Patent No.: US 11,890,749 B1
(45) Date of Patent: Feb. 6, 2024

(54) AUTOMATED STORAGE AND RETRIEVAL SYSTEM FOR RETURNED ASSETS

(71) Applicant: Griffyn Robotech Pvt Ltd, Pimpri-Chinchwad (IN)

(72) Inventors: Amit Anil Mahajan, Cumming, GA (US); Sachinkumar Gorlewar, Pune (IN)

(*) Notice: Subject to any disclaimer, the term of this patent is extended or adjusted under 35 U.S.C. 154(b) by 0 days.

(21) Appl. No.: 17/954,742

(22) Filed: Sep. 28, 2022

(51) Int. Cl.
| | |
|---|---|
| G06F 7/00 | (2006.01) |
| B25J 13/08 | (2006.01) |
| B65G 1/04 | (2006.01) |
| G06Q 10/087 | (2023.01) |
| G06Q 30/08 | (2012.01) |
| G06Q 30/02 | (2023.01) |
| B65G 1/137 | (2006.01) |
| B65G 43/08 | (2006.01) |
| G07F 11/54 | (2006.01) |

(52) U.S. Cl.
CPC .......... *B25J 13/086* (2013.01); *B25J 13/089* (2013.01); *B65G 1/045* (2013.01); *B65G 1/0421* (2013.01); *B65G 1/137* (2013.01); *B65G 43/08* (2013.01); *G06Q 10/087* (2013.01); *G06Q 30/0278* (2013.01); *G06Q 30/08* (2013.01); *G07F 11/54* (2013.01); *B65G 2203/0233* (2013.01); *B65G 2209/00* (2013.01)

(58) Field of Classification Search
CPC ..... B25J 13/086; B25J 13/089; B65G 1/0421; B65G 1/045; B65G 1/137; B65G 43/08; B65G 2203/0233; B65G 2209/00; G06Q 10/087; G06Q 30/0278; G06Q 30/08; G07F 11/54
USPC .................................................. 700/213–215
See application file for complete search history.

(56) References Cited

U.S. PATENT DOCUMENTS

| | | | |
|---|---|---|---|
| 10,192,087 B2 * | 1/2019 | Davis ................... | G06V 10/243 |
| 2023/0051749 A1 * | 2/2023 | Li .......................... | G06T 11/00 |

* cited by examiner

*Primary Examiner* — Yolanda R Cumbess

(57) ABSTRACT

Disclosed is an automated storage and retrieval system (100) for returned assets such as mobile phones and tablets that facilitates reduced labor for transporting into and out of inventory, reduced inventory levels, more accurate tracking of storage locations, and space savings. The system (100) comprises a warehouse management unit coupled to a cloud storage medium for receiving, and storing the returned assets and offering them up for bids through a communication network. The warehouse management unit has a receiving unit, a storage unit having sensor based storage racks (17), a retrieval unit and a packaging unit communicatively coupled to a computing device and a storage medium specifically a cloud network. The assets are graded by evaluating the degree of damage, defects, imperfections that might reduce the value, physical/cosmetic state of a device and the like. The system supports manual, automatic, and semi-automatic storage and retrieval operations with maximum reliability.

10 Claims, 8 Drawing Sheets

AUTOMATED STORAGE AND RETRIEVAL SYSTEM FOR RETURNED ASSETS

RELATED APPLICATIONS

The present application claims the benefit of priority from Indian Patent Application No. 202221043475 titled AUTOMATED STORAGE AND RETRIEVAL SYSTEM FOR RETURNED ASSETS filed with the Indian Patent Office on Jul. 29, 2022.

FIELD OF THE INVENTION

The present invention generally relates to logistics operations and more particularly relates to an automated storage and retrieval system for returned assets such as mobile phones and tablets.

BACKGROUND OF THE INVENTION

In reverse logistics operations of devices such as smartphones and tablets, the devices undergo various checkpoints and tests, to check their functionality, safe erasure, and cosmetic grading based on a rule-based grading system. The outcome of these checks defines the further disposition of these devices, and whether the asset should be forwarded for remanufacturing or for auctioning or replacement.

Normally, these operation involves receiving the devices at receiving unit and carrying out for functionality testing, erasing the flash memory, inspecting for cosmetic conditions, and finally grading based on certain rules. Thereafter, a final disposition is decided based on the final grade. These devices are further labeled and directed to an appropriate landing bucket in warehouses that handle a large volume of returned devices. A storage and retrieval system can certainly minimize the challenges faced by such warehouses in storing these dispositioned devices and retrieving them based on demand from their customers. However, it lacks in providing specificity in terms of retrieval of a specific make, model, grade, color, or any specific parameter of choice. It only provides a consolidated retrieval option based on how these assets are stored. After a rule-based disposition of returned assets, it gets stored at a specific location. The bulk of assets gets packed in boxes and get stored on pallets in the warehouse. The asset's location gets stored in the computer and a processing unit. Now the retrieval of these devices based on bids and final disposition initiates and assets get ready for final shipment.

Currently, these processes are done manually or semi-automated which is time-consuming and error-prone. Due to bulk packaging, retrieval of the individual asset gets difficult and left no choice for an auction bidder to select an individual asset, which makes the whole retrieval process complicated, and manually driven which may be error prone.

Accordingly, there exists a need to provide an automated storage and retrieval system for returned assets that would eliminate the deficiencies of the conventional techniques.

OBJECTS OF THE INVENTION

An object of the present invention is to eliminate manual errors and provide improved productivity of a warehouse for storing and retrieving returned assets such as mobile phones and tablets.

Another object of the present invention is to provide an automated storage and retrieval method for returned assets such as mobile phones and tablets.

Yet, another object of the present invention is to provide a smart automated storage rack for an automated storage and retrieval of returned assets such as mobile phones and tablets.

Yet, another object of the present invention is to allow an auction bidder to select an individual asset from a pool of information of a plurality of available assets based on his/her requirements and makes an easier and convenient retrieval from a remote warehouse.

SUMMARY OF THE INVENTION

The present invention provides an automated storage and retrieval system for returned assets comprising, a receiving unit having a conveyor unit, a cleaning unit, a functionality testing unit, a cosmetic inspection, and grading unit, a bottom frame having a motorized closed-loop indexing table coupled to a first set of sensors, a controller coupled to a control panel, a storage rack column assembly mounted on the bottom frame having a mechanical structure combined with a plurality of storage racks for storing the individual assets, and a control pendant with a plurality of buttons coupled to the controller for supporting a manual operation, a structure assembly consists of a mechanical strengthening member to hold the storage column assembly therein, an aesthetic and functional cover assembly mounted over the structure assembly, a retrieval unit coupled to the storage rack column assembly, a packaging unit coupled to the retrieval unit, and a computing device in communication with the controller to provide control signals thereto.

The receiving unit is mechanically coupled to the storage rack column assembly and is configured for receiving the returned assets, performs authentication, electrical recharging, erasing of the stored data, cosmetic inspection, and grading by evaluating the degree of damage, defects, and imperfections and collecting specific information thereof. The plurality of storage racks receives the assets with a unique id pasted thereon. A plurality of rows in the mechanical structure houses a plurality of light emitting diodes and a second set of sensors coupled to the controller. The controller is configured with an application that produces output signals to drive the motor in response to the signals received from the first set of sensors that gives information on the position of the closed-loop indexing table. The closed-loop indexing table holds and supports the structure assembly by means of an electro-mechanical assembly that rotates and sets the storage racks in position to a preset point.

The retrieval unit has a robotic arm coupled to the computing device through the controller, and a fourth set of sensors coupled to the controller for monitoring the position of the robotic arm with respect to the storage racks secured on the closed-loop indexing table. The robotic arm is configured for retrieving individual assets from the storage rack, in accordance with the instructions received from the computing device.

The computing is connected to a cloud network and is configured with a web-based application with a database that stores the information of each of the assets physically present in the storage rack and an artificial intelligence-based algorithm for calibrating each of the storage racks during the initial installation and docking of the storage rack. The computing device is communicatively connected to the receiving unit, the retrieval unit, the packaging unit, the control pendant, and the electrical control panel assembly receives signals from the first, second, third, and fourth set of sensors, and produces control signals for the motor and the robotic arm by means of the controller.

The computing device by means of the web-based application stored therein creates a database containing information from the receiving unit in a cloud platform, provides access to an individual as well as an auction bidder for a lot selection, allows fine selection of assets based on the information in the database, and selects the highest bid from the available plurality of bid proposals, shortlists, and allocates the lot to the respective auction bidder, allows payment, and generates a request to the controller, to retrieve and package the asset selected by the bidder and sent out to the shortlisted auction bidder.

BRIEF DESCRIPTION OF THE DRAWINGS

The objects and advantages of the present invention will become apparent when the disclosure is read in conjunction with the following figures, wherein.

DETAILED DESCRIPTION OF THE INVENTION

Figure 1:
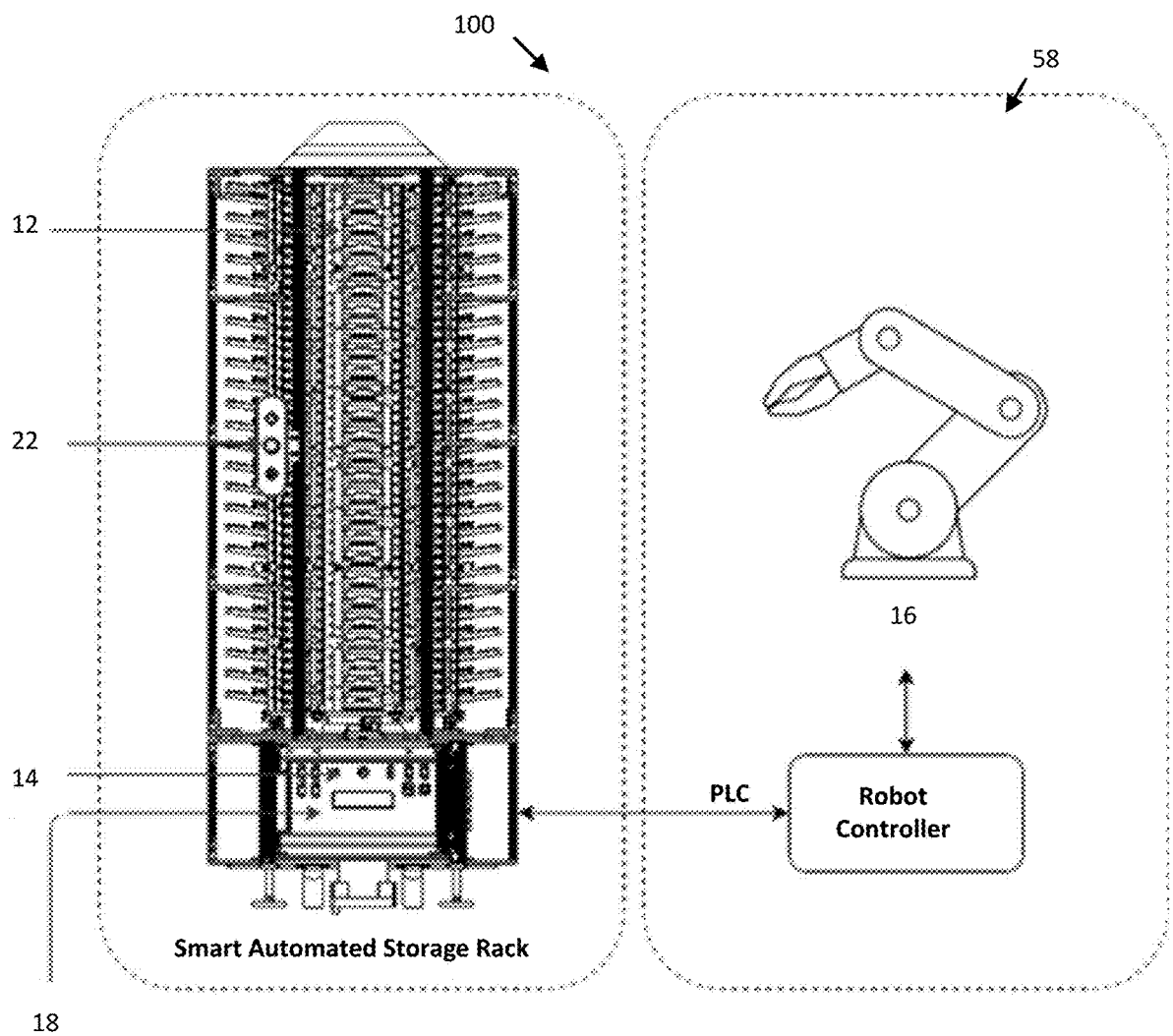
FIG. 1 shows an architecture of an automated storage and retrieval system for returned assets in accordance with the present invention.
Figure 2:
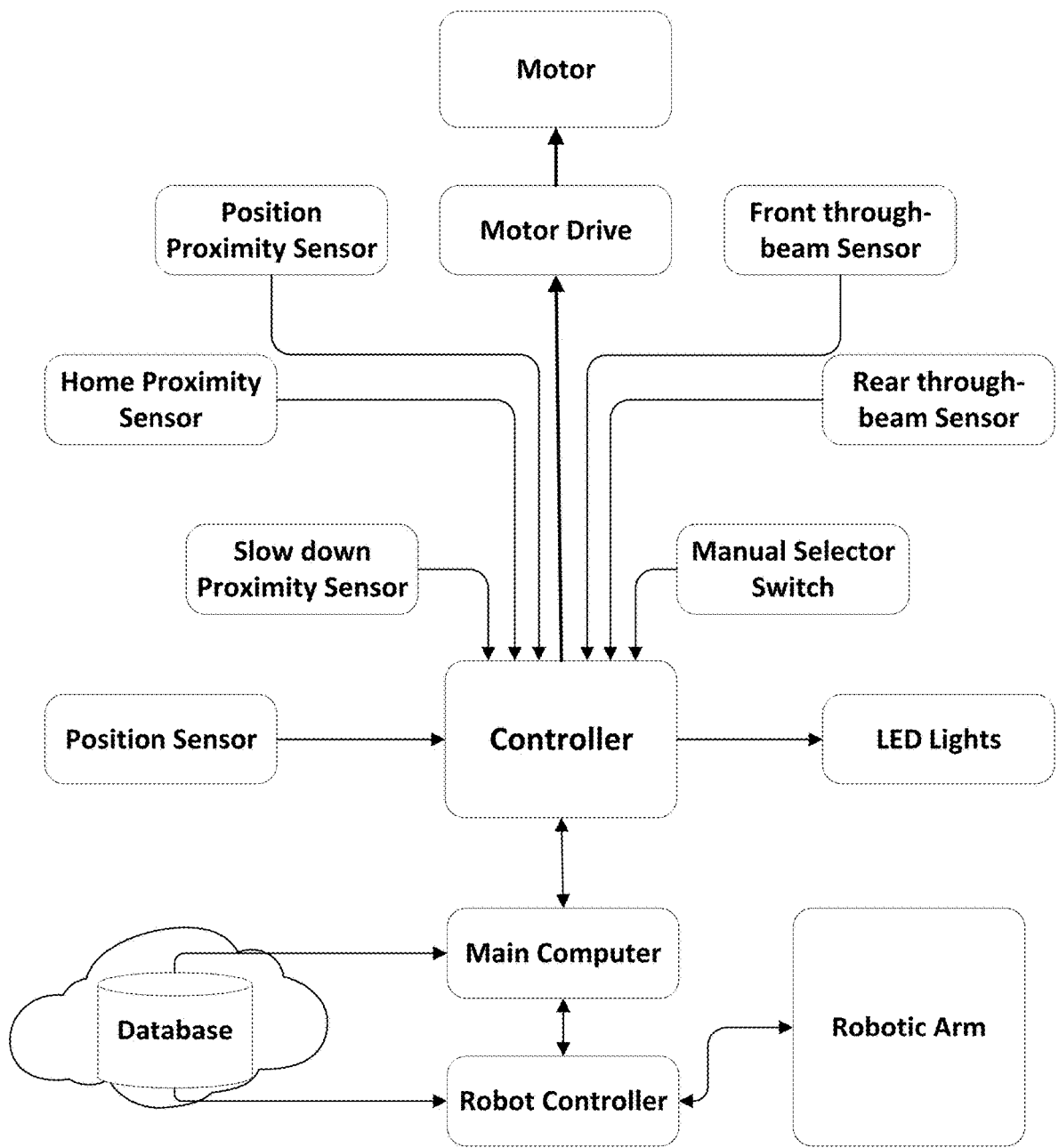
FIG. 2 shows a block representation of the automated storage and retrieval system for returned assets in accordance with the present invention.
Figure 3:
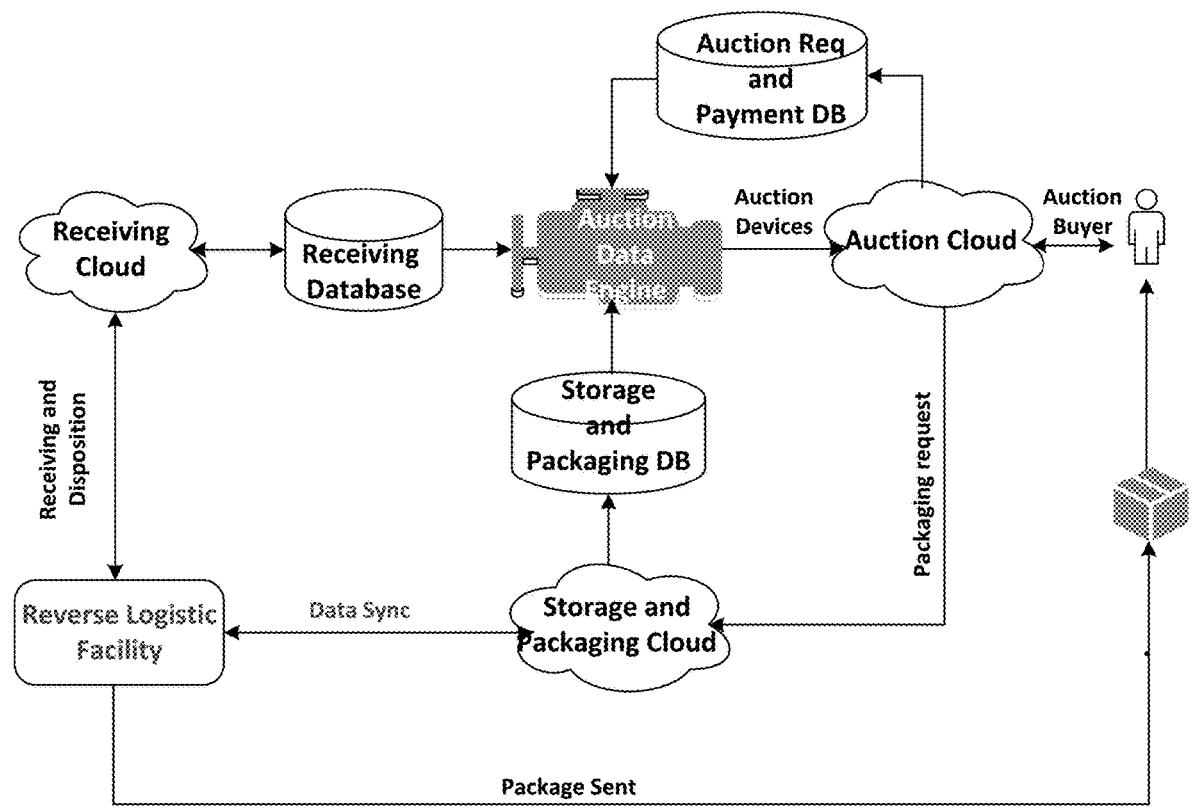
FIG. 3 shows a block representation of warehouse management process in the automated storage and retrieval system for returned assets in accordance with the present invention.
Figure 4A:
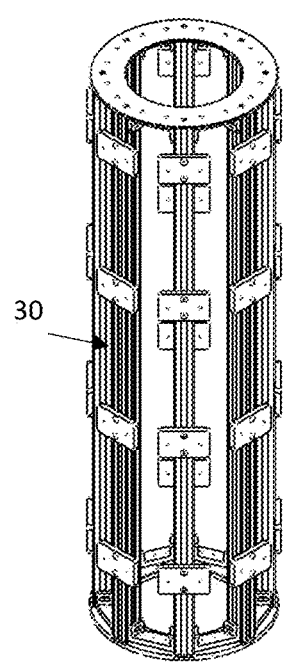
FIG. 4a shows a pictorial view of an automated storage rack in the automated storage and retrieval system for returned assets in accordance with the present invention.
Figure 4B:
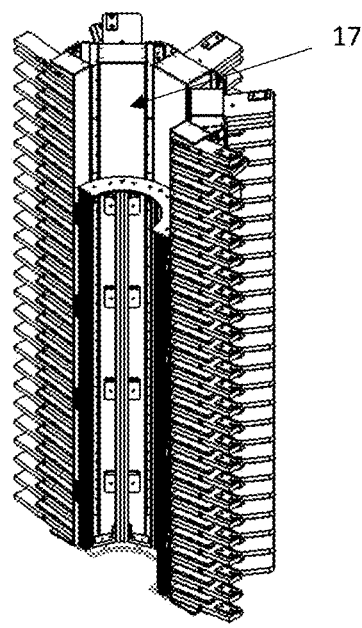
FIG. 4b shows a cross sectional view of an automated storage rack in the automated storage and retrieval system for returned assets in accordance with the present invention.
Figures 5A, 5B:
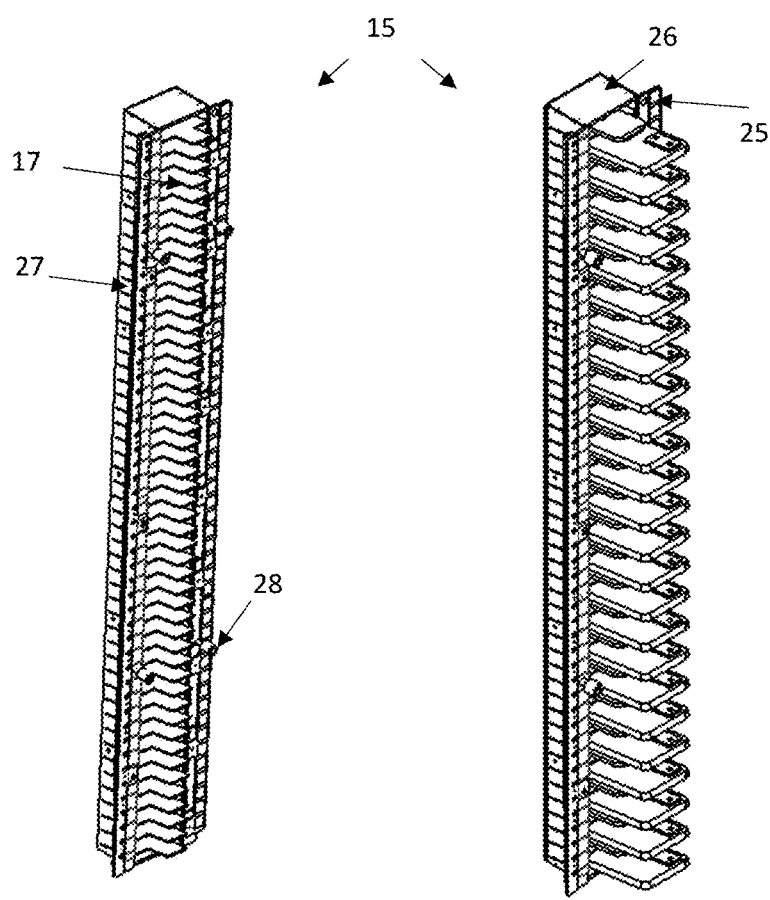
FIG. 5a shows a pictorial view of a storage rack column assembly in the automated storage and retrieval system for returned assets in accordance with the present invention.
FIG. 5b shows a pictorial view of a storage rack column assembly holding assets in the automated storage and retrieval system for returned assets in accordance with the present invention.
Figure 6:
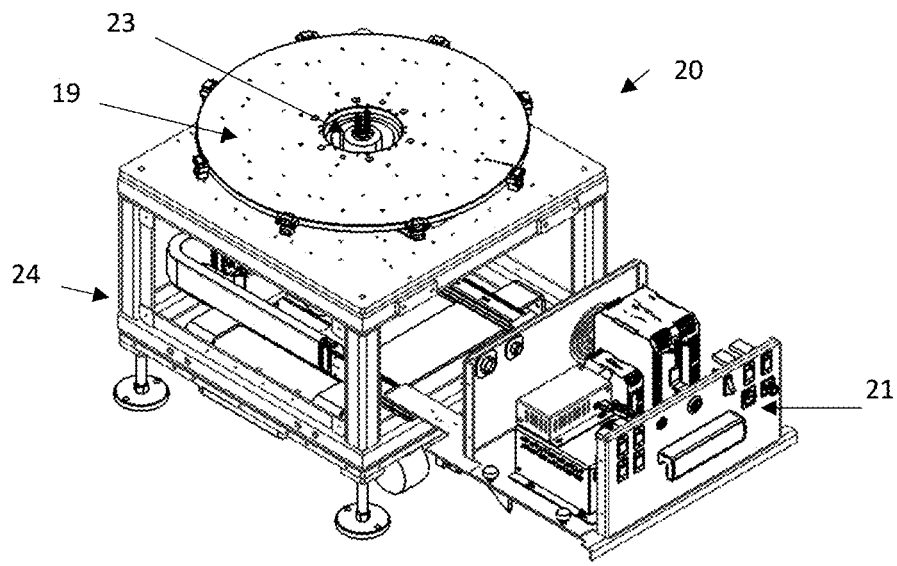
FIG. 6 shows a pictorial view of a bottom frame and electrical control panel assembly in the automated storage rack in an automated storage and retrieval system for returned assets in accordance with the present invention.
Figures 7, 8:
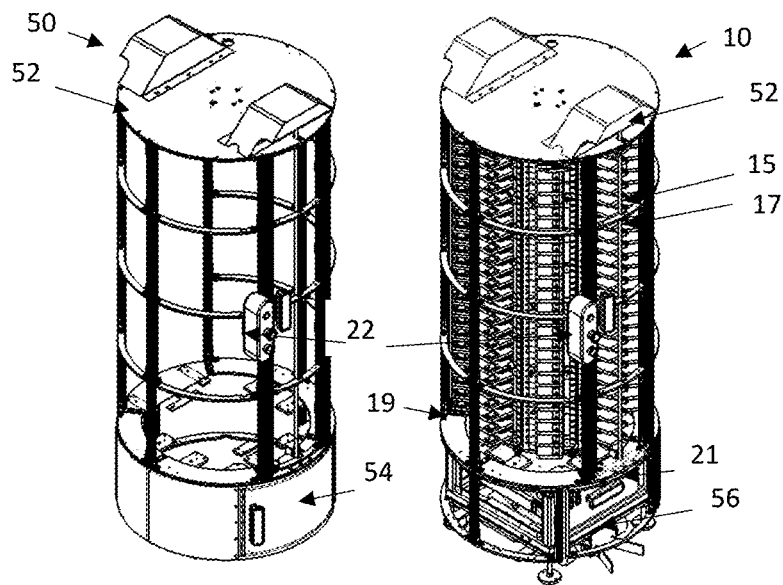
FIG. 7 shows a pictorial view of an aesthetic and functional cover assembly in the automated storage and retrieval system for returned assets in accordance with the present invention.
FIG. 8 shows a pictorial view of a storage and retrieval unit in the automated storage and retrieval system for returned assets in accordance with the present invention.
Figure 9:
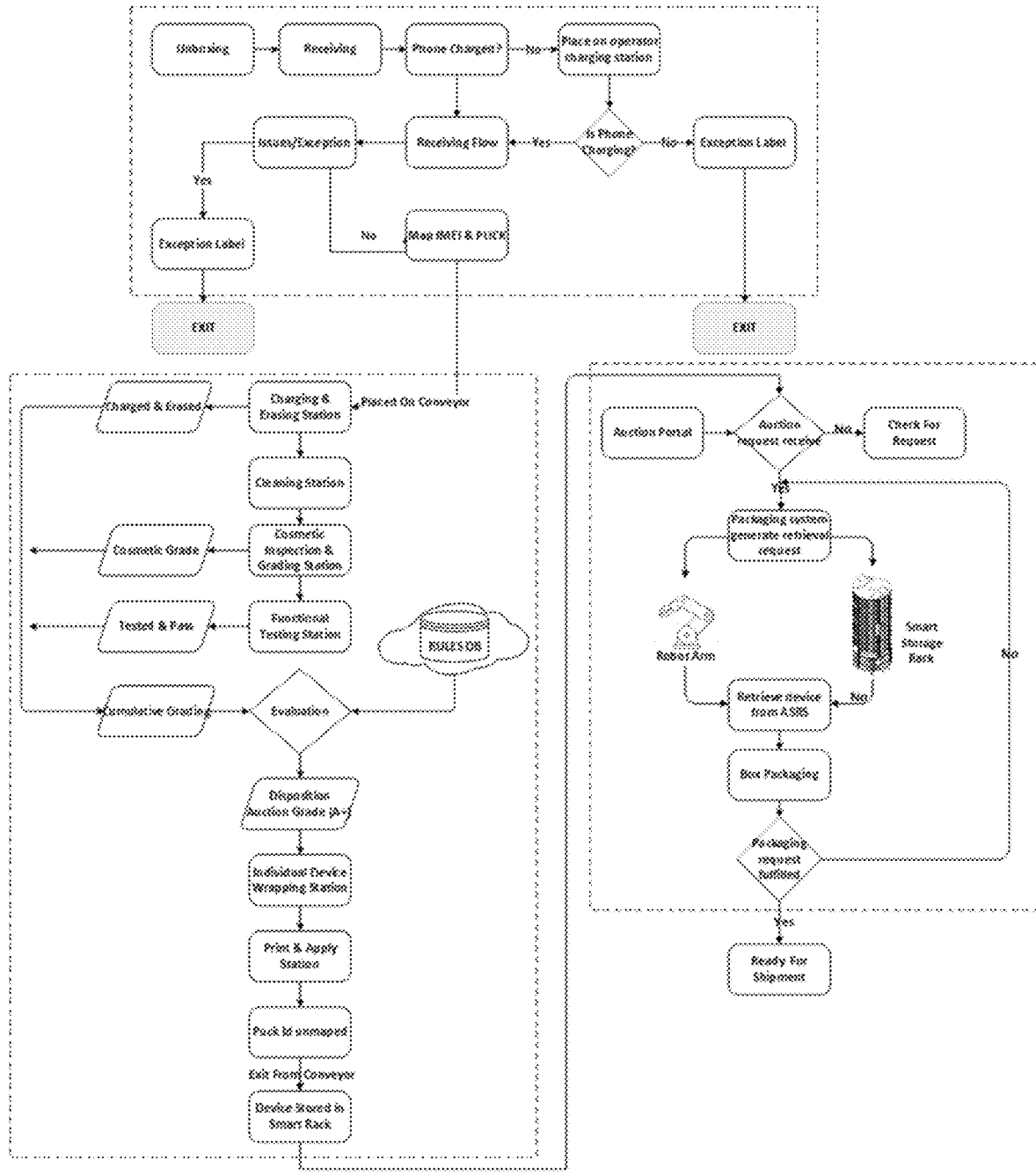
FIG. 9 shows a flow diagram of a method of operation of the automated storage and retrieval system for returned assets in accordance with the present invention.
Figure 10:
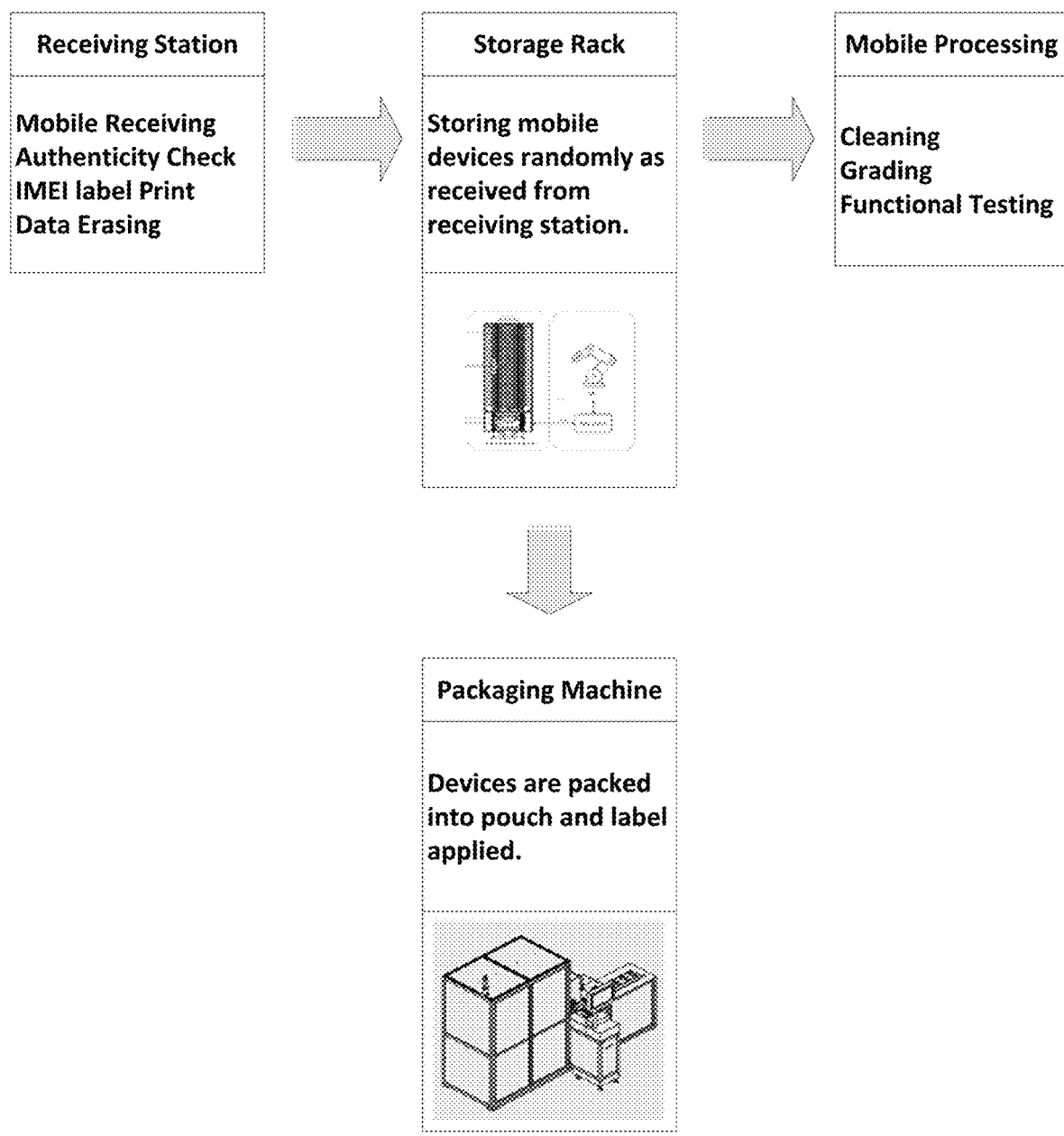
FIG. 10 shows a process flow diagram of a method of operation of the automated storage and retrieval system for returned assets in accordance with the present invention, which includes the major components of the system in context.

The foregoing objects of the present invention are accomplished and the problems and shortcomings associated with the prior art, techniques, and approaches are overcome by the present invention as described below in the preferred embodiments.

The present invention provides an automated storage and retrieval system for returned assets such as mobile phones and tablets that facilitates reduced labor for transporting into and out of inventory, reduced inventory levels, more accurate tracking of storage locations, and space savings. The system comprises a warehouse management unit coupled to a cloud storage medium for receiving, and storing the returned assets and offering them up for bids through a communication network. The assets are graded by evaluating degree of damage, defects, imperfections that might reduce value, physical/cosmetic state of a device and the like. The system supports manual, automatic, and semi-automatic storage and retrieval operations with maximum reliability.

The warehouse management unit has a receiving unit, a storage unit having IoT based storage racks, a retrieval unit and a packaging unit communicatively coupled to a computing device and a storage medium specifically a cloud network.

In the following description, for the purpose of explanation, specific details are set forth in order to provide an understanding of the present invention. It will be apparent, however, to one skilled in the art that the present invention may be practiced without these details. One skilled in the art will recognize that embodiments of the present invention, some of which are described below, may be incorporated into a number of systems.

Furthermore, connections between components and/or modules within the figures are not intended to be limited to direct connections. Rather, these components and modules may be modified, re-formatted or otherwise changed by intermediary components and modules.

Throughout this application, with respect to all reasonable derivatives of such terms, and unless otherwise specified (and/or unless the particular context clearly dictates otherwise), each usage of:

"a" or "an" is meant to read as "at least one."

"the" is meant to be read as "the at least one."

References in the present invention to "one embodiment" or "an embodiment" mean that a particular feature, structure, characteristic, or function described in connection with the embodiment is included in at least one embodiment of the invention. The appearances of the phrase "in one embodiment" in various places in the specification are not necessarily all referring to the same embodiment.

Embodiments of the present invention include various steps, which will be described below. The steps may be performed by hardware components and may be embodied in machine-executable instructions, which may be used to cause a general-purpose or special purpose processor programmed with the instructions to perform the steps. Alternatively, steps may be performed by a combination of hardware, software, firmware and/or by human operators.

Various methods described herein may be practiced by combining one or more machine-readable storage media containing the code according to the present invention with appropriate standard computer hardware to execute the code contained therein. An apparatus for practicing various embodiments of the present invention may involve one or more processors and storage systems containing or having network access to computer program(s) coded in accordance with various methods described herein, and the method steps of the invention could be accomplished by modules, routines, subroutines, or subparts of a computer program product.

In some embodiments, the systems may be configured as a distributed system where one or more components of the system are distributed across one or more networks in a cloud computing system.

If the specification states a component or feature "may' can", "could", or "might" be included or have a characteristic, that particular component or feature is not required to be included or have the characteristic.

As used in the description herein and throughout the claims that follow, the meaning of "a, an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art.

Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Hereinafter, embodiments will be described in detail. For clarity of the description, known constructions and functions will be omitted. Parts of the description may be presented in terms of operations performed by an Electrical/Electronic system, using terms such as state, link, ground, fault, packet and the like, consistent with the manner commonly employed by those skilled in the art to convey the substance of their work to others skilled in the art. As is well understood by those skilled in the art, these quantities take the form of data stored/transferred in the form of electrical, magnetic, or optical signals capable of being stored, transferred, combined, and otherwise manipulated through mechanical and electrical components of the electronic/ electrical systems; and the term electronic/electrical/computer system includes general purpose as well as special purpose data processing machines, switches, and the like, that are standalone, adjunct or embedded.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

The present invention is illustrated with reference to the accompanying drawings, throughout which reference numbers indicate corresponding parts in the various figures. These reference numbers are shown in brackets in the following description and in the table below.

TABLE 1

| Component Name | Component Number |
| --- | --- |
| Storage and retrieval unit | 10 |
| Storage rack column assembly | 15 |
| Robotic arm | 16 |
| Storage rack | 17 |
| Indexing table | 19 |
| Bottom frame | 20 |
| Control panel | 21 |
| Control pendant | 22 |
| Slip ring | 23 |
| Tubular frame | 24 |
| Barcode | 25 |
| Calibration point | 26 |
| LED indication | 27 |
| Mastering Pin | 28 |
| Structure assembly | 30 |
| aesthetic and functional cover assembly | 50 |
| Upper cover | 52 |
| Lower cover | 54 |
| Docking | 56 |
| Retrieval unit | 58 |

Referring to figures from 1 to 9, an automated storage and retrieval system for returned assets (100) (the system (100)' hereinafter) is shown, in accordance with the present invention. The system (100) comprises a receiving unit, storage rack column assembly (15) coupled to the receiving unit, a structure assembly (30) holding the storage rack column assembly (15), an aesthetic and functional cover assembly (50) mounted over the structure assembly (30), a retrieval unit (58) coupled to storage rack column assembly (15), and a packaging unit coupled to the retrieval unit. The receiving unit, the retrieval unit, and the packaging unit are communicatively coupled to a computing device.

The computing device has at least one processor in communication with a memory and a communication module that connects the processor to the cloud network server. The computing device is configured with an application that receives and processes the information corresponding to the returned assets, stores and upload the information into a database configured in the cloud network. The database comprises a packaging database, data engine, a payment database, an auction module, a storage and packaging module, and like. The computing device is also configured for controlling the operation of the IoT devices and all the electronic components connected thereto.

The receiving unit, the packaging unit, and a storage and retrieval unit in communication with the cloud network forms a warehouse management unit in which final disposed assets can be stored and retrieved on the requirement.

The receiving unit has a conveyor unit, a cleaning unit, a functionality testing unit, and a cosmetic inspection and grading unit. The receiving unit is set up for reception and authentication of the returned assets wherein the authentication procedures include determining whether the received asset is the same one described on the return material authorization number/RMA number that was originally sold by the merchant. The receiving unit is set to collect the data regarding the inventory profile such as product number or stock-keeping unit (SKU), standard cost data, etc., data specific to the particular device such as serial number, date put into service, lost/stolen flag, etc., and data required for receipt of the asset such as return material authorization (RMA) number, etc. The exceptional assets such as stolen assets or assets having an expired warranty, or likewise are bypassed through this procedure. The conveyor unit is further configured for electrical recharging and erasing of the data stored in the assets placed thereon and provides a cosmetic inspection and grading thereof, by evaluating the device for damage, defects, and imperfections that might reduce value. The process of cosmetic grading determines the physical/cosmetic state of a device and contributes to the value determination for a secondary market. Further, the functionality testing unit does functionality testing of various features such as AGPS, audio, battery, camera, communication, display, and sensors in each of the assets. The functionality testing results and the information such as International Mobile Equipment Identity (IMEI), stock-keeping unit (SKU), and profile type are stored in the computing device. The whole process is automatic process and are performed with the help of an articulated robot configured within the receiving unit. Further, the computing device generates a cumulative grade for the cosmetic inspection and functionality testing. This information is loaded to a database configured within the cloud network by the computing device. After evaluation of cumulative grade and disposition rule, the final disposition takes place, by providing auction grade for each of the assets stored in the receiving unit.

The receiving unit is coupled to the storage rack column assembly (15) consisting of a plurality of rows that houses a plurality of light-emitting diodes (LED) (27) and IoT devices. The storage rack column assembly (15) enclosed by the structure assembly (30) forms a plurality of storage racks (17) for storing the individual assets received by the receiving unit. The structure assembly (30) represents a mechanical strengthening member that provides support to the plurality of storage racks (17). In the embodiment, the storage rack column assembly (15) is configured within the structure assembly (30) having a mechanical strengthening member to hold the storage racks (17) for providing support thereto. The structure assembly (30) is mounted on a closed-loop indexing table (19) by means of an electro-mechanical assembly and holds the storage rack column assembly (15) hence forming a main load-bearing member to provide support to the plurality of storage racks (17).

In the exemplary embodiment of the invention, the structure assembly (30) is a mechanical structure removably fitted around the storage rack column assembly (15) for support. The storage rack column assembly (15) is coupled to an electromechanical assembly containing a motor, and a closed-loop indexing table (19) secured in a bottom frame (20). The closed-loop indexing table is coupled to a first set of sensors that gives information on position thereof. The indexing table (19) is rotatably coupled to a motor shaft by means of a coupling assembly. The electromechanical assembly includes a gear mechanism, a chain-sprocket or a belt-drive, and the like for coupling the indexing table (19) with the storage rack column assembly (15) which is securely mounted on the indexing table (19). This makes the storage rack (12) swivel around the vertical axis upon the bottom frame (20). Thus the plurality of storage racks (17) in the storage rack column assembly (15) is configured as a rotary structure with indexing thereof. Further, a control pendant (22) with a plurality of buttons supporting the manual operation of retrieval is also secured thereon. The control pendant (22) has a forward/reverse toggle switch, an emergency push button, and an LED indication for the manual operation of the retrieval process.

The storage rack column assembly (15) is coupled to the receiving unit (10) in such a way that it can receive the assets therefrom and stock them in a suitable rack in the storage rack (17). In the embodiment, each of the storage racks (17) are arranged for receiving individual assets that are wrapped with plastic/foam for protection and provided with a unique id pasted thereon. For every individual asset, specific storage racks (17) are assigned by the computing device based on the information collected by the receiving unit. The storage racks (17) are configured for indexing a specific storage rack column facing a robotic arm (16) for the retrieval of individual assets stored therein. The storage rack column assembly (15) in accordance with an embodiment of the invention is also movably coupled to the robotic arm (16) which is in communication with the controller.

The indexing table (19) couples the rotational motion of the motor to the storage rack column assembly (15) by means of a coupling assembly, in accordance with a sensor-based closed-loop system driven by the controller. The indexing table (19) and the robotic arm (16), are coupled to the controller, and the latter is further communicatively coupled to the computing device. The control module provides control signals to the robotic arm (16), and the motor based on the feedback signals from the first set of sensors connected thereto.

In the embodiment, the first set of sensors that closely monitors the indexing table (19) forms a closed-loop system in association with the robotic arm (16) to perform specific operations with increased accuracy and repeatability. The first set of sensors includes proximity sensors that function as feedback sensors, to provide data on the real-time position of the indexing table (19). In an exemplary embodiment of the invention, the robotic arm includes an articulated robot having 6 degrees of mobility for pick and place the assets in specific locations. The robotic arm (16) has the capacity to advance in 3 translational and 3 rotational degrees of motion.

The indexing table (19) in accordance with an embodiment of the invention allows the plurality of storage racks (17) identified with index numbers such as barcodes for identification of individual storage racks and thereby the specific asset stored therein. The information collected by the receiving unit which is available in the database is used for issuing an identification mark on each of the assets before storing and using the same identification for accessing the respective asset from the allotted storage rack. Thus, the database maintains an inventory of the stored assets and corresponding storage racks (17) where they can be found. Further, retrieval of the required asset is accomplished by inputting specific details of the required asset and quantity to be retrieved by means of the computing device coupled to the storage rack column assembly (15).

The retrieval unit contains a control panel (21), specifically an electrical control panel mounted on the bottom frame (20). The bottom frame (20) houses the control panel (19) in communication with the motor, the first set of sensors, and the control module. The bottom frame also comprises a slip ring (23), and a gear mechanism to couple the torque produced by the motor to the indexing table (19) and the storage rack column assembly (15). The indexing table (19) is configured for accurate indexing of specific storage racks (12) with the help of the motor. The motor receives instructions from the control module based on the feedback signals from the first and a second set of sensors. The first and a second set of sensors includes proximity sensors that function as home sensors, slow down sensors, and position sensors. The sensors provide necessary positional accuracy by providing a feedback signal on the position of the storage racks (19) and the indexing table (21)

and establishing a closed-loop communication within the retrieval unit (58). In the specific embodiment of the invention, the motor is an electric motor being coupled to the indexing table and the control module by means of the motor drive mechanism. The slip ring is integrated for the effective harnessing of the storage rack column assembly (15). Further, the control module includes an application stored therein to communicate with the onboard computing device (14) enclosed in a replaceable enclosure.

The storage rack column assembly (15) in accordance with the embodiment of the invention consists of a plurality of rows for storing individual assets, and each of the rows has the unique barcode that can be mapped to the asset's IMEI provided for the retrieval process. The storage racks (17) are configured with a second set of sensors specifically proximity sensors coupled to the controller. The second set of sensors are configured for monitoring the position of the storage rack (17). Each of the racks is also provided with an individual LED for determining the presence or absence of an asset and is useful for the manual retrieval process. Each of the storage racks (17) in the storage rack column assembly (15) is designed in such a way that it can be easily integrated into an automation line or with a robotic arm (16). This is achieved by an AI-based algorithm stored in the onboard computing device that calibrates along with physical mastering for every storage rack (17) during the initial installation and docking of the storage rack (17) inside an aesthetic and functional cover assembly (50).

The aesthetic and functional cover assembly (50) consists of an upper outer cover and a bottom outer cover. The upper outer cover has third set of sensors specifically, at least two through-beam sensors mounted on it, for checking the position of the asset kept in each of the storage racks (17). At least two through-beam sensors are configured for detecting whether the asset is correctly placed in the rack or not. The two through-beam sensors pass comments to the storage rack (17) and the computing device before indexing the storage rack (17) for the next column retrieval process.

In an embodiment of the invention, the system (100) also comprises automated guided vehicles for taking the assets into and out of the storage unit and moving them between a shipment floor and storage racks (17).

Again referring to the diagrams from 1 to 9, according to an implementation of the present invention, the system (100) operates in manual mode and automated mode for storing and retrieving a plurality of assets in/from the storage rack (17). The storage rack (17) has space for storing a plurality of assets such as mobile phones or tablets individually by maintaining a record of the asset's IMEI and location in a storage medium. In the embodiment, this information is stored in the onboard computing device and a database in the cloud network forms the packaging database.

In the initial stages of operation, an assembling of the storage rack is done with the support of the second set of sensors specifically the proximity sensors or home sensors. Accurate positioning of the storage racks (17) is necessary in order to configure the individual storage rack column for robotic operation by stopping the indexing table exactly at the point of the position sensor. The position sensor provides feedback to the motor, to reduce the speed of rotation, such that the storage rack column can be stopped at required position.

After the initialization process of the storage rack column, the receiving unit receives the assets for authentication procedures. The conveyor unit collects data regarding each of the received assets such as master or inventory profile for example the product number or stock-keeping unit (SKU), standard cost data, etc. is stored in the computing device. Further this data is used to form a database in the cloud platform by the computing device. The database includes a data engine, an auction module, a packaging database, and like. The data engine includes information on assets for auction, salvage, or repair and this data is also available for the auction module. The application stored in the computing device also provides disposition rules to the data engine over the cloud network for correct disposition. Further, the packaging database continuously synchronized with onboard computing device that have the information on all the assets which are physically present in the storage rack (17).

Further, in the next step, the status of storage is updated, and this data may be stored in the auction module and the packaging database. The packaging database is in synchronism with the packaging unit and all the packaging requests that are passed by the auction module are evaluated and prioritized by the application stored in the computing device. The application in the onboard computing device is further configured such that an auction portal is provided at the auction bidder's end, with a user interface, and gives information on the available assets for auction, with details of make, model, color, grade, and price of each asset. Also, each of the plurality of the assets that are secured in the storage rack (17) has specific details such as IMEI, SKU, and asset id stored in a database. Thus all such information stored in the database is made available for an auction database in the auction portal relevant to an auction process. The base price of all the assets is also displayed on the auction portal. The auction portal provides access to an individual as well as lot selection for an auction bidder, for a fine selection of assets based on all sub-categories such as make, model, color, grade, memory, and price. The auction module may facilitate the auction portal to receive and store the required data from the storage medium in the cloud network. This auction portal is web-based and hence accessible on a web portal where an auction bidder can log in and apply for a bid. The auction bidder can select asset based on the types of assets, their grade, make, model, and color base amount for the bid. For reverting to the base price, the auction bidder can bid with a desired amount on the portal. Similarly, the application allows a plurality of auction bidders and therefore multiple bids. The auction module selects the highest bid from the available plurality of bid proposals, shortlists, and allocates the lot to the respective auction bidder. After the allocation, the auction bidder receives the payment link, after successful payment, an auction module generates a request to the retrieval unit.

The location of the assets as per specification prescribed in the auction module and the information of assets that are located in storage racks (17), such as their SKU, grade, and disposition is stored in a packaging database. The auction request, payment information, receiving data, and storage and packaging data are given for the auction module. The auction module thus runs an algorithm and maps required assets with its request. After successful mapping, the retrieving data is generated and stored in an auction cloud.

Thereafter, in response to the request from the auction module, the retrieval unit generates a retrieval request to the controller. The control module further generates signals for the robotic arm (16) for retrieval of a specific asset from the storage rack (12). The auction module directs the robot arm (16) to the retrieval location in the storage rack (17) where the required asset is stored. The storage and packaging module in the database determines the location in the storage rack (17) where the required asset can be retrieved and schedules the retrieval. The robotic arm (16) retrieves all the requested assets and places them in a box. The box is then sent to the packaging unit for packaging, where a shipment label is generated which contains the IMEI of all the assets which are in the box and pasted automatically on the package. Finally, a quick check for packaging request fulfillment takes place and the package is sent out to the shortlisted auction bidder.

In the manual mode of operation for storing assets in the storage rack (17), the operator scans the barcode of a particular slot in the storage rack (17) and places the asset therein. After scanning, the respective IMEI may get mapped with the barcode on the respective storage rack (17). For retrieval operation, an LED indication is provided for the user, for guidance. This indicates the slot in the respective storage rack (17) from where the asset shall be retrieved. In the embodiment, a color code given for the LED indication represents, that a blue light indicates the slot is ready for storing a particular asset which is having specific configuration, a green light indicates, that the asset is ready for retrieval and final packaging and a red light indicates the assets that shall be removed from the rack at the time of fresh loading.

In the automatic mode of operation, the storage rack column (15) aligns itself to the retrieval location by initiating the second set of sensors and scan the storage rack (17) and detect the presence of an asset therein. The presence of an asset is detected by the third set of sensors that provides feedback to the robotic arm (16) in case of the presence of an asset in the slot. Thus the robotic arm (16) retrieves the specific asset and passes it to further process. The request for retrieval of the asset is raised by the application stored in the computing device connected to the cloud network. A corresponding signal is provided to the storage rack (17) and the robotic arm (16). Accordingly, an indexing table points the targeted storage rack (17) before the robotic arm (16) as a retrieval location. The robotic arm (16) movement and vibration and jerk-free motion are ensured by a fourth set of sensors. This includes a slowdown sensor and a position sensor for ensuring the accuracy of stopping the rack. When the rack reaches to retrieval location the control module passes a signal to start the robotic arm (16) into action.

The system also performs semi-automatic operations for storing/retrieving the asset from a storage rack (17). For semi-automatic mode, an LED-driven mechanism is provided, which helps the operator for smooth and infallible retrieval of assets. During the retrieval operation, the auction and retrieval module in the application passes a command signal to the storage rack (17) and respective robotic arm (16). Accordingly, the storage rack (17) aligns to a retrieval location, and the robotic arm (16) having a specially designed gripper, picks the asset from the specific storage rack (17).

The benefits of the system (100) include reduced labor for transporting a plurality of assets such as mobile phones, and tablets into and out of inventory, reduced inventory levels, more accurate tracking of assets, and space savings. The plurality of assets are often stored more densely than in systems where items are stored and retrieved manually. The automation process introduced in the system (100) reduces labor costs while lowering workforce requirements and increasing safety, enabling a seamless link to order processing and logistics management in order to pick, pack, and ship assets out of the facility. The system (100) also gives high-density storage in compact space and selective lot creation as per the auction bidder's requirement during the auction process. The system (100) further provides individual asset storage and its tracking through the communication network specifically a cloud network.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enable others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the scope of the present invention.

We claim:

1. An automated storage and retrieval system for returned assets (100), the system (100) comprising:
    a receiving unit for receiving assets, the receiving unit comprising a conveyor unit, a cleaning unit, a functionality testing unit, and a cosmetic inspection and grading unit, wherein the receiving unit is configured to: receive and authenticate, perform electrical recharge, erase stored data, perform cosmetic inspection and grading;
    a bottom frame (20) having
    a closed-loop indexing table (21) coupled to a first set of sensors,
    a motor assembly coupled to the closed-loop indexing table (21) by means of a coupling assembly that rotates the closed-loop indexing table (21) around a vertical axis, the motor assembly comprising:
    a controller coupled to a control panel, wherein the controller includes at least one processor in communication with a memory, the memory is configured with an application that produces output signals to motor drive in response to the signals received from the first set of sensors, wherein the first set of signals give information on the position of the closed-loop indexing table (21),
    a storage rack column assembly (15) mounted on the bottom frame (20), the storage rack column assembly (15) is coupled to the receiving unit (10) for receiving the assets, the storage rack column assembly (15) comprising:
    a mechanical structure combined with a plurality of storage racks (17) for storing the individual assets, wherein the plurality of storage racks (17) are configured to receive and index assets each asset identified by a unique identification code,
    a plurality of rows in the mechanical structure, the plurality of rows housing a plurality of light emitting diodes and a second set of sensors coupled to the controller, wherein the second set of sensors is configured to monitor a position of the storage rack (17), and
    a control pendant (22) comprising a plurality of buttons coupled to the controller module, the control pendant (22) is configured to support a manual operation;
    a structure assembly (30) comprising a mechanical strengthening member to hold the storage column assembly (15) therein and provide support thereto, wherein the structure assembly (30) is mounted on the closed-loop indexing table (21) by means of an electromechanical assembly, that rotates the storage column assembly (15) and the closed-loop indexing table sets the position of storage racks (17) to a preset point;

an aesthetic and functional cover assembly (50) mounted over the structure assembly (30), the aesthetic and functional cover assembly (50) having an upper cover (52) and a bottom cover (54), the upper cover having a third set of sensors coupled to the controller for monitoring the position of the asset placed in each of the storage racks (17);

a retrieval unit coupled to the storage rack column assembly (15), the retrieval unit comprising:

a robotic arm (16) coupled to the computing device through the controller, and a fourth set of sensors coupled to the controller for monitoring the position of the robotic arm (16) with respect to the storage racks secured on the closed-loop indexing table (21), wherein the robotic arm (16) is configured for retrieving individual assets from the storage rack (17), in accordance with the instructions received from the computing device;

a packaging unit coupled to the retrieval unit, the packaging unit configured to package the retrieved asset by the robotic arm (16) in the retrieval unit; and a computing device in communication with the controller to provide control signals thereto, the computing device having at least one processor a memory and communication device that is connected to a cloud network, wherein the memory is configured with a web-based application having a database that stores the information of each of the assets physically present in the storage rack (17), and an artificial intelligence-based algorithm for calibrating each of the storage rack (17) during the initial installation and docking of the storage rack (17) wherein the computing device is connected to the receiving unit, the retrieval unit, the packaging unit, the control pendant (22), and the electrical control panel assembly (20), and the control device receives signals from the first, the second, the third and the fourth set of sensors, and produce control signals for the motor assembly and the robotic arm (16) by the controller;

wherein the computing device, using the web-based application stored therein creates a database containing information from the receiving unit in a cloud platform, provides access to an individual for a lot selection, allows fine selection of assets based on the information in the database, selects the highest bid from the available plurality of bid proposals shortlists, allocates the lot to the respective auction bidder, allows payment, and generates a request to the controller to retrieve and package the asset selected by the bidder and sent out to the shortlisted auction bidder.

2. The system (100) of claim 1, wherein the web-based application and the database include a data engine, an auction module, and packaging database, and payment database.

3. The system (100) of claim 1, wherein the electromechanical assembly includes a gear train, a chain-sprocket or a belt-drive.

4. The system (100) of claim 1, wherein the first and second set of sensors include proximity sensors, the third set of sensors include at least two through-beam sensors and the fourth set of sensors include slow down sensors, and position sensors.

5. The system (100) of claim 1, wherein the controller is configured to receive instructions from the computing device, and locate the position of the selected asset in the storage rack (17), by considering the feedback signals from the second and the fourth set of sensors, produce control signals for the motor to bring the storage rack (17) to a position, activate the robot arm (16) to move towards the retrieval location in the storage rack (17) and retrieve the selected asset.

6. The system (100) of claim 1, wherein the system is configured to operate in automatic, semiautomatic and manual mode.

7. The system (100) of claim 1, wherein the receiving unit is configured to collect specific information about each asset to create an inventory profile, the inventory profile comprising one or more of: product number, stock-keeping unit (SKU), standard cost, data specific to the particular device, the data specific to a particular device including: serial number, date put into service, lost/stolen flag, and data required for receipt of the asset, the data required for the receipt of the asset including return material authorization (RMA) number, wherein the collected specific information is stored in the database for auction purposes.

8. The system (100) of claim 1, wherein the control pendant (22) is configured with a forward/reverse toggle switch, emergency push button, and LED indication for supporting the manual operation of storage and retrieval of assets from the storage rack (17).

9. The system (100) of claim 1, wherein the structure assembly (30) is a mechanical structure removably fitted around the storage rack column assembly (15) for support.

10. The system (100) of claim 1, wherein the control pendant (22) is configured with a forward/reverse toggle switch, an emergency push button, and an LED indication for the manual operation of the retrieval process.

* * * * *